United States Patent [19]

Cepulis

[11] Patent Number: 5,144,551
[45] Date of Patent: Sep. 1, 1992

[54] COMPUTER MEMORY MANAGEMENT METHOD UTILIZING SEGMENTATION AND PROTECTION TECHNIQUES

[75] Inventor: Darren J. Cepulis, Houston, Tex.

[73] Assignee: Compaq Computer Corporation, Houston, Tex.

[21] Appl. No.: 714,552

[22] Filed: Jun. 13, 1991

Related U.S. Application Data

[63] Continuation of Ser. No. 354,144, May 19, 1989, abandoned.

[51] Int. Cl.⁵ .............................. G06F 12/00
[52] U.S. Cl. .................. 395/425; 364/DIG. 1; 364/232.9; 364/246.6; 364/246.7; 364/247; 364/247.3; 364/247.2; 364/243; 364/243.4; 364/243.41; 364/255.7; 364/255.1; 364/254.8; 364/264; 364/264.1; 364/DIG. 1; 395/650; 395/700
[58] Field of Search ............ 395/650, 700, 425

[56] References Cited

U.S. PATENT DOCUMENTS

| | | | |
|---|---|---|---|
| 4,525,780 | 6/1985 | Bratt et al. | 364/200 |
| 4,580,217 | 4/1986 | Celio | 364/200 |
| 4,761,737 | 8/1988 | Duvall et al. | 364/200 |

OTHER PUBLICATIONS

Oct. 20, 1988 Intel Corporation letter and attachments from Ms. S. Roach regarding emulating 286 Loadall instruction. Attachments include suggested code for emulation.
Microprocessor and peripheral handbook, vol. 1, Intel Corp. 1988, pp. 4-121-4-127.
J. Crawford, P. Gelsinger, Programming the 80386, Sybex, 1987, pp. 54-59, 431-477, 488-489, 644-646.

*Primary Examiner*—Kevin A. Kriess
*Attorney, Agent, or Firm*—Pravel, Gambrell, Hewitt, Kimball & Krieger

[57] ABSTRACT

A method for managing memory in a computer system utilizing Intel Corporation's method of segmentation, memory management and protection techniques. The method is directed toward loading all computer registers and segment descriptor tables from a table of pre-stored values in memory while operating in real mode. At least two of the registers addresses are in excess of the real mode boundary of 1 Mbyte. The method described permits these registers to be loaded, without the generation of illegal flag values or general protection violations.

3 Claims, 8 Drawing Sheets

| 80286 LOADALL memory format User Register Area ||
|---|---|
| Offset | Register |
| 800 | None |
| 806 | MSW |
| 808 | None |
| 816 | TR |
| 818 | Flag Word |
| 81A | IP |
| 81C | LDT |
| 81E | DS |
| 820 | SS |
| 822 | CS |
| 824 | ES |
| 826 | DI |
| 828 | SI |
| 82A | BP |
| 82C | SP |
| 82E | BX |
| 830 | DX |
| 832 | CX |
| 834 | AX |

FIG. 5A

| 80286 LOADALL memory format Segment Descriptor Area ||
|---|---|
| Offset | Register |
| 836 | ES (BASE) |
| 839 | ES (AR) |
| 83A | ES (LIMIT) |
| 83C | CS (BASE) |
| 83F | CS (AR) |
| 840 | CS (LIMIT) |
| 842 | SS (BASE) |
| 845 | SS (AR) |
| 846 | SS (LIMIT) |
| 848 | DS (BASE) |
| 84B | DS (AR) |
| 84C | DS (LIMIT) |
| 84E | GDTR |
| 854 | LDT |
| 85A | IDTR |
| 860 | TSS |

FIG. 5B

| 386 LOADALL BUFFER ||
|---|---|
| Field Type | Field |
| DW | DS GDT LIMIT |
| DD | DS GDT BASE |
| DW | ES GDT LIMIT |
| DD | ES GDT BASE |
| DW | DS GDT 286 LIMIT |
| DW | DS GDT 286 BASE_LO |
| DB | DS GDT 286 BASE_HI |
| DB | DS GDT 286 ACCESS |
| DW | DS GDT 286 RESERVED WORD |
| DW | ES GDT 286 LIMIT |
| DW | ES GDT 286 BASE_LO |
| DB | ES GDT 286 BASE_HI |
| DB | ES GDT 286 ACCESS |
| DW | ES GDT 286 RESERVED WORD |
| DW | DS LDT 386 LIMIT_LO |
| DW | DS LDT 386 BASE_LO |
| DB | DS LDT 386 BASE_MID |
| DB | DS LDT 386 ACCESS |
| DB | DS LDT 386 LIMIT_HI |
| DB | DS LDT 386 BASE_HI |
| DW | ES LDT 386 LIMIT_LO |
| DW | ES LDT 386 BASE_LO |
| DB | ES LDT 386 BASE_MID |
| DB | ES LDT 386 ACCESS |
| DB | ES LDT 386 LIMIT_HI |
| DB | ES LDT 386 BASE_HI |

COMPUTER MEMORY MANAGEMENT METHOD UTILIZING SEGMENTATION AND PROTECTION TECHNIQUES

This is a continuation of copending application Ser. No. 07/354,144 filed on May 19, 1989 now abandoned.

BACKGROUND OF THE INVENTION

1. Field of the Invention

The present invention relates to memory management of a computer system utilizing Intel Corporation microprocessors.

2. Description of the Prior Art

Many of the personal computers used today are based on the Intel Corporation's family of microprocessors, including the 8088, 8088-2, 8086, 80186 (hereinafter referred to collectively as the 8086), 80286 and 80386. It has been Intel's practice to maintain downward compatibility throughout its line of microprocessors, such that programs designed to run on the 8086 may generally run on the 80386 microprocessor. This is accomplished by maintaining a consistent core of microprocessor instructions throughout the family. However, the newer microprocessors, the 80286 and 80386, have expanded sets of instructions. The 80286 instruction set is a superset of the 8086 instruction set. Similarly, the 80386 instruction set is a superset of the 80286 instruction set.

However, this compatibility is not without its price. The 8086 microprocessor has several limitations. First, the 8086 does not support multi-tasking operations. Multi-tasking refers to a computer's ability to run more than one application at a single time or to run background operations while other tasks are being carried out. Second, the 8086 microprocessor is limited in Random Access Memory (RAM) capacity to 1 Mbyte of memory. As a practical matter, an 8086 is actually limited to 640 kbyte of RAM in personal computers compatible with the International Business Machine Corporation's (IBM) PC and using Microsoft Corporation's MS-DOS as an operating system because the range from 640 kbyte to 1 Mbyte is reserved for various additional devices and system memory. Further, the 8086 memory addresses generated by the various operating systems and applications programs represent the real or physical addresses in RAM memory, known as real mode operation.

With the introduction of the 80286, Intel introduced a new architecture which included memory management and protection techniques. These techniques permitted accessing memory addresses in excess of the 1 Mbyte 8086 limitation. Further, the architecture supported a protection technique which ensured that multi-tasking operations would be insulated from each other and would not access another task's data. This mode of operation is known as protected mode. Real mode and protected mode are mutually incompatible operational modes for Intel's microprocessors. The 80286 represents a significant improvement over the 8086 in terms of speed, capability and flexibility. However, when running 8086 programs, the 80286 runs in real mode and is subject to the very same limitations as the 8086.

Similarly, the 80386 microprocessor is capable of carrying out multi-tasking operations and accessing memory addresses as high as 4 Gbytes. However, when running 80286 and 8086 programs designed to run in real mode, it too acts as an 80286 or 8086 in real mode.

Realizing this limitation, Intel introduced with the 80386 a mode known as 8086 virtual mode. The virtual mode supports the memory management and techniques normally utilized by the 80386 and permits 8086 virtual tasks to operate as part of a multi-tasking system. Thus, the 80386 is capable of running multiple 8086 virtual tasks accessing memory addresses in excess of the 1 Mbyte real limit, as well as protected mode 80286 and 80386 tasks.

However, it will be appreciated that during this evolution of the Intel microprocessor family that a number of instructions written specifically for the 8086 and 80286 were necessarily supported in the 80386. The reason for supporting these machine specific instructions is that operating systems or applications programs utilized these special commands as opposed to focusing on using the common core of commands.

One of these commands is an undocumented instruction known as the LOADALL command. The LOADALL command is designed to load all of the segment selector registers and segment descriptor caches from values stored in memory at physical address 800$h$ (where the $h$ suffix indicates hexadecimal notation). It was designed to be used primarily for Intel testing purposes. However, its ability to rapidly load all registers and descriptor caches with a single command resulted in its use by operating systems and several applications programs.

In 1988, Intel announced that it was discontinuing support for the 80386 LOADALL instruction and was going to remove it from the 80386 instruction set. This 80386 instruction was used to emulate the 80286 LOADALL instruction. Like the 80286 LOADALL instruction the 386 LOADALL was undocumented. However, it has not been widely used in application or operating system software. The reason given by Intel was that newer operating systems, such as Microsoft Corporation's OS/2, automatically determine the type of processor, would recognize an attempt to run an 80286 instruction on an 80386 and would generate a fault which would cause the operating system to run in 80286 mode as opposed to the faster 80386 mode.

At the time of the announcement, Intel suggested a technique which could be used to emulate the 286 LOADALL instruction. However, the technique did not address all the problems which might occur. The suggested emulation avoids the loading of illegal or invalid values in the segment selector flag fields by arbitrarily entering a valid code which modifies the selector privilege level to the highest level (0). However, the suggested technique for emulating the LOADALL instruction manipulates the protection scheme such that a general protection violation may occur. It will be appreciated that task data integrity is critical in any multi-tasking environment and that such protection errors cannot be tolerated.

SUMMARY OF THE PRESENT INVENTION

The present invention relates to a method for loading all registers and segment descriptor caches from a table of prestored values, including addresses in excess of 1 Mbyte, while operating in real mode. The present invention performs all the functions of the 286 LOADALL instruction without using the now unsupported 386 LOADALL instruction. Further, the present invention modifies selector flag field to prevent entry of invalid values while maintaining general privilege protection during operation of the system.

BRIEF DESCRIPTION OF THE DRAWINGS

FIGS. 5A, 5B and 5C are tables showing the location and registers in the 286 LOADALL buffer.

DETAILED DESCRIPTION OF THE INVENTION

The present invention cannot be adequately described without a discussion of addressing techniques, memory management and protection techniques utilized by Intel microprocessors. While this discussion is directed primarily toward Intel's 80386 microprocessor, it will be appreciated that the present invention in its current embodiment is expected to perform similarly on any Intel Corporation microprocessor which adheres to Intel's memory segmentation, addressing and protection techniques common to the 80286 and 80386 microprocessor, an example of which is Intel's 80486 microprocessor. What follows is a brief description of the above techniques. For a more thorough discussion of the above topics, see, Intel, *Microprocessor and Peripheral Handbook*, Vol. I, Intel Corp. 1987 and J. Crawford and P. Gelsinger, *Programming the 80386*, Sybex 1987.

The 80386 utilizes 16 registers of three different types and lengths. The first set of registers are eight 32 bit registers referred to as the general registers EAX, EBX, ECX, EDX, ESP, EBP, ESI and EDI. Further, the X registers, EAX for example, may be accessed independently as 16 bit registers, where AX represents the lower 16 bits of the EAX register. The X registers may also be accessed as eight bit registers. For example, the AL and AH registers represent the low and high eight bits of the AX register and represents bits 0-7 and bits 8-15 of the EAX register. Other of the registers are used for specific purposes. The ECX/CX register is used to hold string length during string operation instructions. Other of the X registers have specific characteristics which are outside the scope of the present invention and will not be discussed a this time.

The remaining general registers may be accessed only as 16 or 32 bit registers. Thus, SP represents the lower 16 bits of the ESP register. Some of the remaining general registers also have specific functions. The ESP/SP register is used to point to the last command placed on the command stack (command stack registers will be addressed below) and is commonly referred to as the Stack Pointer. ESI/SI and EDI/DI are used in string operations to point to the source and destination of the string, respectively.

The second type of registers are the two 32 bit status and control registers, EIP and EFLAGS. Like the general registers, these registers may be accessed as 16 bit registers IP and FLAGS. The EIP/IP register is used for only one function, to point to the next instruction to be executed by the microprocessor. The EFLAGS/FLAGS register contains several status and control flags which dictate the type of arithmetic operations to be performed, as well as sign and parity flags.

The last group of registers are the 16 bit segment selector registers ES, CS, SS, DS, FS and GS. Two of the segment registers are used for a specific purpose. The SS register refers to the segment containing the command stack for the task being executed. As mentioned above, the ESP/SP pointer is utilized to indicate where the last command in the stack selector register is located. The CS segment register is used to address the current code segment. A segment selector register includes information relating to the requested privilege level, the descriptor table being referenced and the index within the descriptor table.

The term segment refers to a memory segment of variable length created by the 80386, the operating system, or an application program. A segment is defined by three types parameters, its base—where the segment begins; its limit—how long the segment is; and its attributes—which set characteristics such as the type of software (80386, 80286, etc.), the privilege level and the type of segment. These segment descriptors are stored in a table known as the descriptor table (DT). The descriptor tables are index accessible, the index being the contents of the segment selector registers.

These general registers and segment registers are utilized in addressing memory within the 80386. Before describing how these registers are used, a brief discussion regarding physical and virtual memory is warranted. A physical memory address refers to a unique actual address in computer memory. A virtual address refers to an address which does not directly correspond to a physical memory location A virtual address is translated or mapped out to a physical address location using one or more mapping functions in the 80386. The 80386 manages virtual addressing using a two part addressing technique, known as a segmentation technique. The first part of the address is specified by a segment selector register, which refers to a specific descriptor table and the index under which segment descriptor information (base, limit and attributes) may be found in virtual memory. The second part of the address is the offset, which indicates where within the segment specified by the segment selector and descriptor the requested information may be accessed. The offset itself is designed to be very flexible, and may be formed in a number of different manners. See, e.g., *Programming the 80386*, supra, p. 55, Table 2.2.

The segmented address defines the memory address in virtual memory. This virtual address is converted to a physical address within the 80386 utilizing a mapping process. The 80386 utilizes a two stage mapping process. The first stage is the segmentation mapping of the virtual memory to a linear address space. The second stage is a paging technique which translates the linear address to a physical address within memory. Segmentation is always active in the 80386. However, paging may be turned off by the particular application or the operating system. When paging is turned off, the linear address generated by segmentation mapping is used directly as a physical address. The use or non-use of paging in the mapping of memory addresses is outside the scope of the present invention. Accordingly, it should be understood that the present invention is independent of whether paging has been enabled.

Figure 1A:
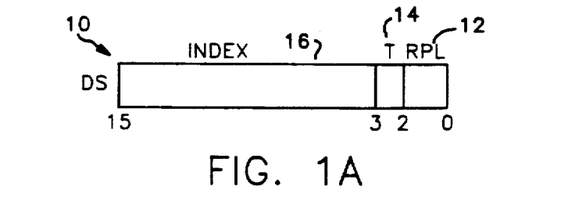
FIGS. 1A, 1B and 1C are illustrative of the relationship between segment selectors, descriptor tables, virtual memory and linear address space.
Figure 1B:
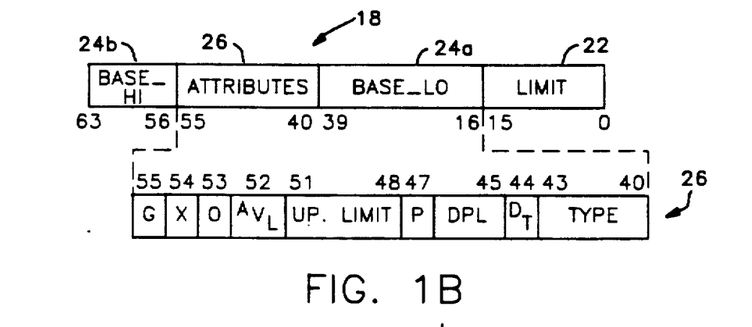
Figure 1C:
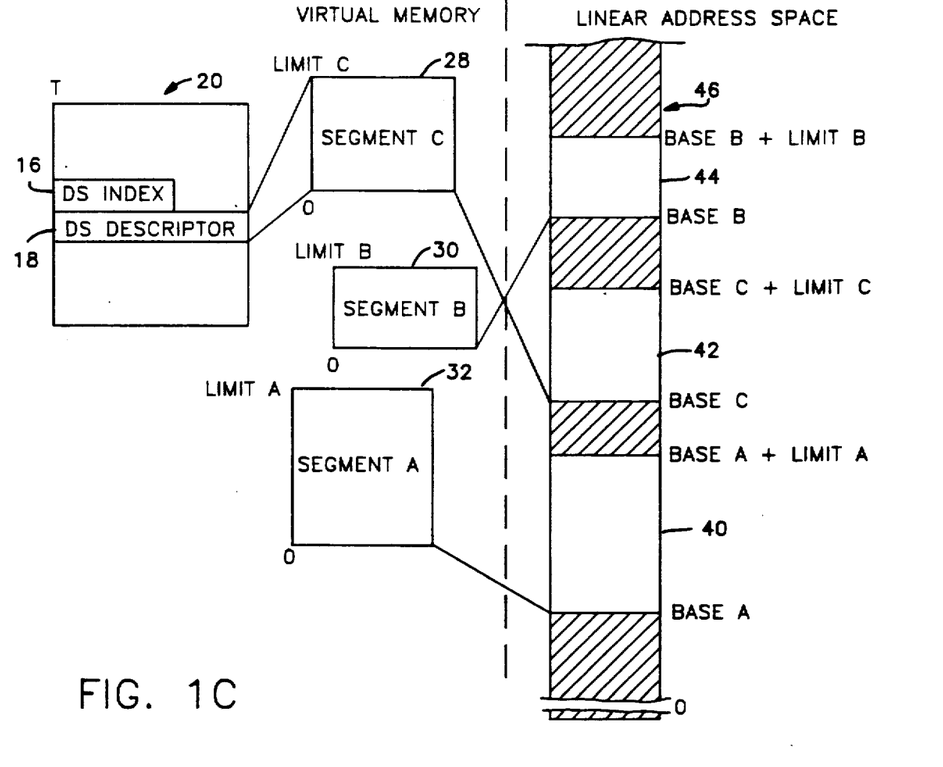

FIGS. 1A-1C illustrate the above discussion. In FIG. 1A, the DS segment selector register 10, is shown as having three fields. Bits 0-2 are the requested privilege level (RPL) 12; bit 3 is the table descriptor 14 which refers to either a local descriptor table for the task or a global table to be used by all tasks; bits 4-15 are the index 16 which designates where in the descriptor table cache the descriptor for the particular segment may be accessed. Having specified the descriptor table 14 and the index 16, the segment selector register refers to descriptor table 20 T (FIG. 1C). The index 16 is used to look up the descriptor cache 18 (FIG. 1B) associated with index 16. The descriptor cache 18 includes the three attributes which describe the virtual memory address; the limit 22, bits 0-15; the base, formed by concatenating base_lo 24a, bits 16-39, and base_hi 24b, bits 56-63; and the attributes, bits 40-55. The attributes include bits 40-43 which specifies the type of operations that may be performed on the segment; bit 44, DT, which identifies the selector as a system segment (0) or gate descriptor (1); bits 45-46, the descriptor privilege level; bit 47, the present bit; bits 48-51, the upper limit, which is concatenated with the segment limit field 22 to form the full limit; bit 52, the available to software bit; bits 53-54 which are ignored by the system; and bit 55, which sets the limit granularity. Using the segments selector register 10 and the segment descriptor cache 18, segment C 28 has been described in virtual memory. Other segments, segment A 32 and segment B 30 are shown in virtual memory. The base and limit are used to place the segment 42 in the linear address space 46. Segments A 32 and B 30 are also shown as having been translated to linear address space as segments 40 and 44, respectively.

Figure 2A:
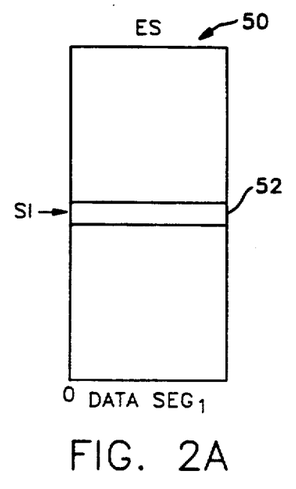
FIGS. 2A and 2B are illustrative of how memory within segments is accessed.
Figure 2B:
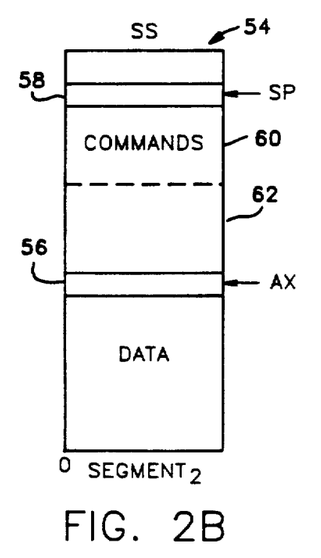

Memory segments may contain data, structures, commands, command stacks, interrupts, flags or some combination thereof. For example, in FIG. 2A, Data Segment 1, has been specified using segment selector ES, in the manner shown in FIGS. 1A-1C. Specific information 52 within the segment is accessed using an offset, specified by register SI, from the beginning (0) of the segment selected by selector register ES. Thus, information 52 may be accessed using the notation ES:SI, where ES specifies the particular segment and SI the segment offset. In FIG. 2B Segment 2 54 is a combination of both commands and data. Segment 2 54 has been specified using segment selector SS. FIG. 2B shows specific data 56 which may be accessed using the segment selector/offset notation SS:AX. Likewise, the last command on the stack 60 within segment 2 54 may be referenced using the notation SS:SP. It should be noted that segments using combined information as shown in FIG. 2B are limited to 16 bit registers.

Associated with the concept of virtual and physical addresses are microprocessor operating modes. The 8086 processors utilized physical memory addressing without any of the resource allocation or protection techniques utilized in the 80286 or 80386 microprocessors. This is known as real mode operation. When 80286 or 80386 run programs designed for an 8086 in real mode, they operate as if they were 8086 microprocessors. Real mode also has a memory addressing limitation of 1 Mbyte, where an 80386 running in protected mode has a memory addressing limitation of 4 Gbyte.

Beginning with the 80286, Intel introduced the memory management, resource allocation and protection schemes described in part above. This mode of operation is referred to as protected mode. Protected mode was designed to allocate resources and manage memory in a multi-tasking environment. One further note is that with the introduction of 80386, Intel introduced a mode known as 8086 Virtual mode. The 8086 virtual mode permits an 80386 to run several 8086 tasks at once, as well as tasks running under a protected mode.

Figure 3:
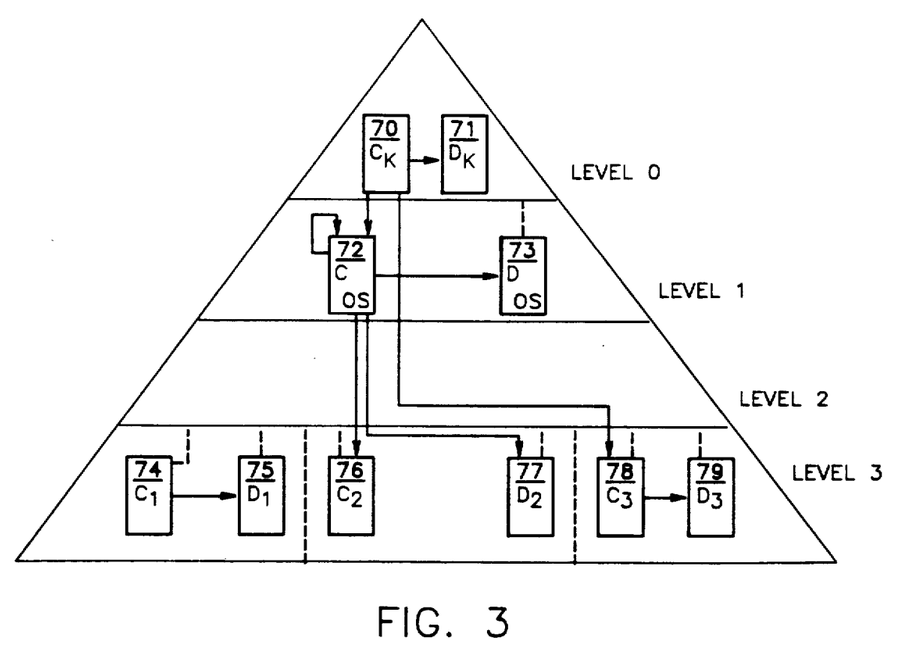
FIG. 3 is an illustration of the privilege level hierarchy.

The concept of protected mode is illustrated in FIG. 3, which is shown as running three applications tasks. Within this scheme exist four privilege levels, level 0 being the highest level and level 3 the lowest. To avoid a general protection violation when loading a register, the descriptor privilege level DPL must be equal to or less than that of the requested privilege level or the current privilege level CPL of the process. Thus, the operating system kernel and remainder of the operating system generally have privilege levels of 0 and 1, respectively. As shown in FIG. 3, the code $C_k$ 70 and data $D_k$ 71 kernel segments of the operating system have a privilege level of 0 and may access any data or code segments having a privilege level of 0 or lower. In FIG. 3, $C_k$ 70 is shown as accessing $D_k$ 71 (privilege=0), code for the remainder of the operating system $C_{os}$ 72 and code for application number three $C_3$ 78. The operating system at privilege level=1, is also capable of accessing segments having lower protection than itself. In FIG. 3, $C_{os}$ 72 is shown as accessing the code $C_2$ 76 and data $D_2$ 77 segments for application number 2. While the operating system at level one may access segments have an equal or lower privilege level, it may not access privilege level=0 segments (shown as dashed access lines). Application number one in FIG. 3, shows that both the code $C_1$ 74 and data $D_1$ 75 segments may be accessed by a higher privilege level and may access other privilege level=3 segments. However, various applications are not permitted to access code or data at privilege level=3 not a part of that task. Thus, the protection mechanism segregates the task segments and prevents the tasks from interfering with the other's operations.

Figure 4:
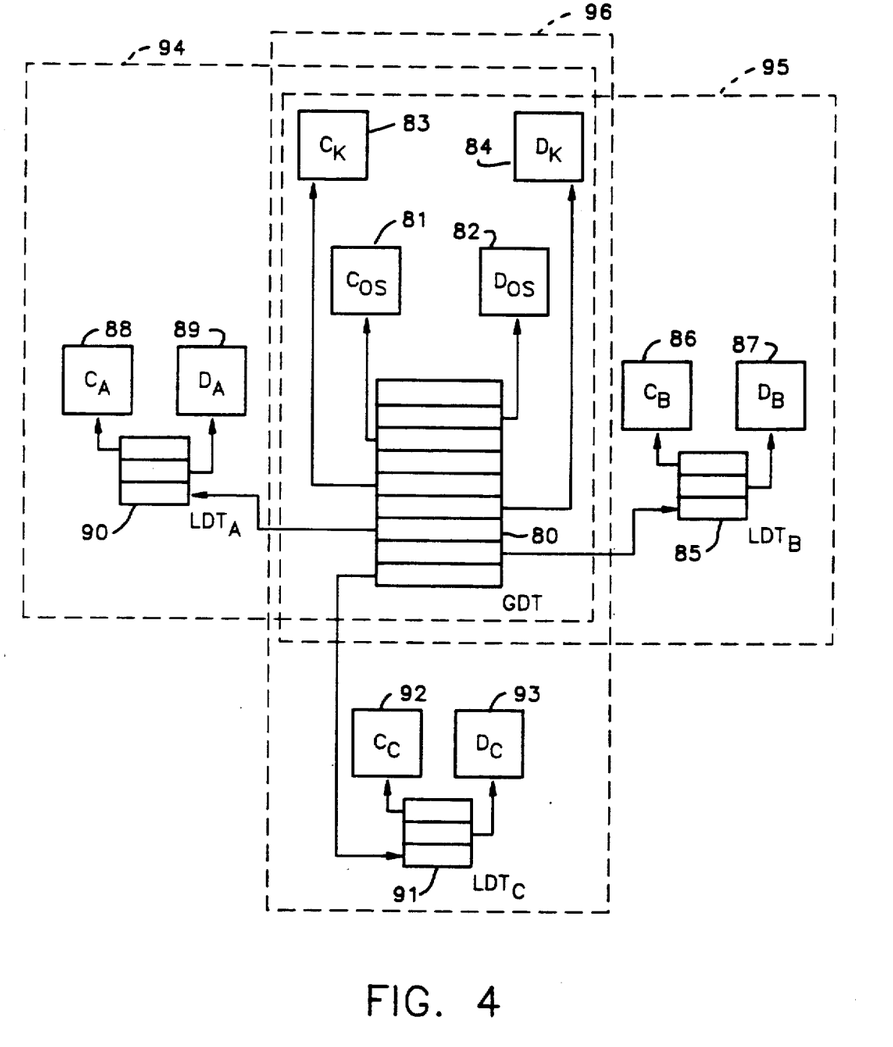
FIG. 4 is illustrative of how Global Descriptor tables and Local Descriptor Tables are used to maintain protection in a multi-tasking environment.

However, it was recognized that the various tasks all needed access to various segments at higher protection levels, such as operating system code. As part of its protected mode, Intel created two types of descriptor tables: a Global Descriptor Table (GDT) and a Local Descriptor Table (LDT). FIG. 4 illustrates the interrelation of GDT's and LDT's. Three tasks are running on the 80386, task A 94, task B 95 and task C 96. Task 1 94 has an $LDT_a$ 90 which maps out code and data segments $C_a$ 88 and $D_a$ 89. Task B 95 has an $LDT_b$ 85 which maps out code and data segments $C_b$ 86 and $D_b$ 87. Task C 96 has an $LDT_c$ 91 which maps out code and data segments $C_c$ 92 and $D_c$ 93. Also shown in FIG. 4 is GDT 80. GDT 80 maps out all three local descriptor tables 90, 85, 91. In addition, GDT 80 maps out the code and data segments for the operating system and operating system kernels, $C_{os}$ 81, $D_{os}$ 82, $C_k$ 83 and $D_k$ 84, respectively. As can be seen from FIG. 4, all three tasks 94, 95, 96 share the common GDT 80. When task A 94 is running, segments $C_a$ 88, $D_a$ 89, are accessible through $LDT_a$ 90 and the kernel and OS segments $C_k$ 83, $D_k$ 84 and $C_{os}$ 81 and $D_{os}$ 82 are accessible through GDT 80. Further, when task A 94 is executing, the segments unique to task B 95 and task C 96 cannot be accessed as they are not a part of the virtual memory of the machine. Task B 95 and task C 96 access segments in a similar manner. In this manner, the use of LDT's isolate a task from other tasks. While each of the tasks 94, 95 and 96 have been shown as having a single code and data segment, it will be appreciated that each task may have multiple code and data segments.

The 286 LOADALL instruction loads all visible registers and segment descriptors from a designated table (LOADALL buffer) in memory at physical address 800h. The instruction has been used in some applications and operating systems programs. As originally designed, the LOADALL instruction is executable in either real or protected mode. However, in order to execute the command in the protected mode as suggested by Intel, the requested privilege level associated with the instruction had to be set at privilege level 0 (highest privilege). The LOADALL instruction served several purposes. First, it reduced the number of assembler language instructions required to load all of the 80286 registers. Second, it permitted real mode operations to have limited access to memory higher than the 1 Mbyte real mode boundary.

Figure 5A:
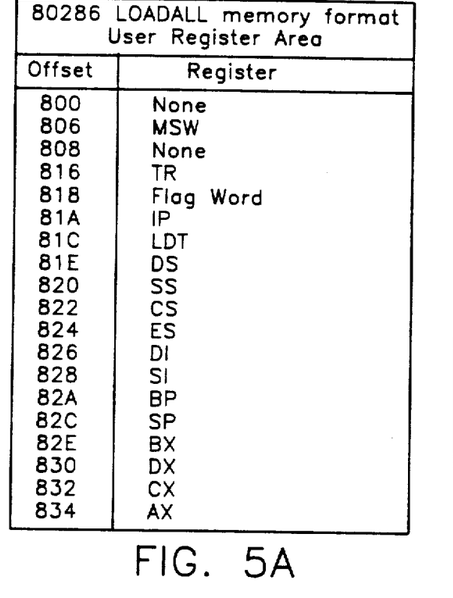
Figure 5B:
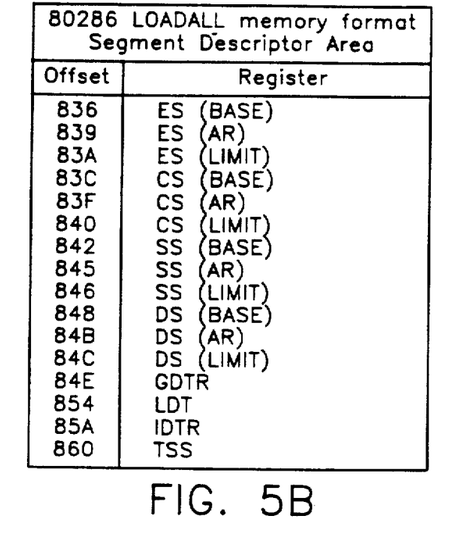
Figure 5C:
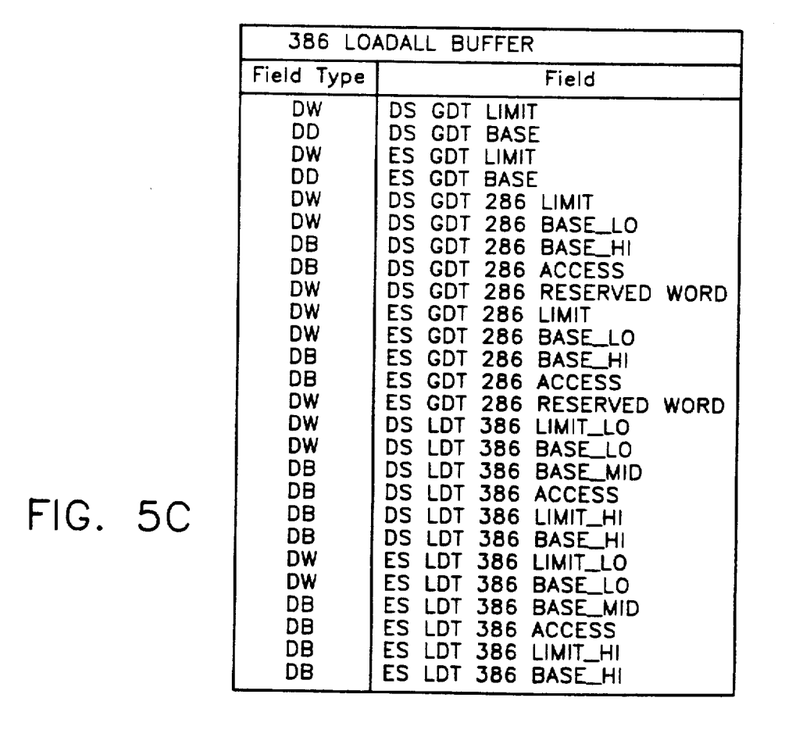
FIG. 5C is a table of the LOADALL emulation buffer.

Having briefly discussed the techniques used in memory management, the present invention, like the 286 LOADALL instruction is designed to load all of the registers and segment descriptor caches from a table which exists in memory located at 800h. FIG. 5A is a table which lists the 286 LOADALL buffer and structures. Similarly, FIG. 5B sets for the location of the segment descriptors which are associated with the various operational registers listed in FIG. 5A and other descriptors used in the operation of the 80386. The present invention also utilizes a LOADALL emulation buffer. This buffer is show in FIG. 5C. The LOADALL emulation buffer is equated to the LOADALL buffer in the present invention. The 286 LOADALL buffer includes a structure for the ES and DS descriptor caches and is equated to the 286 LOADALL buffer. Thus, any changes to the 286 LOADALL DS and ES entries are reflected in the LOADALL emulation buffer.

The present invention is a method for loading registers and descriptor caches in accordance with the 286 LOADALL instruction. With the non-existence of the 286 LOADALL instruction (0F05h) in the 80386 instruction set and the removal of the 80386 LOADALL instruction, the 80386 will generate an illegal operation exception code 6 and interrupt the pending process upon processing a 286 LOADALL instruction. The 386 LOADALL command (070Fh) will also generate an illegal exception equal to 6. The present invention traps the generation of any illegal operation code. The method then determines whether the illegal operation code generated is a 6 code and was generated in response to the processing of a 286 LOADALL instruction. If the illegal operation code is the result of a 286 LOADALL instruction, the present invention continues the emulation of the 286 LOADALL without using the 80386 LOADALL instruction. Further, the present invention determines if the illegal operation code is generated by an 80386 LOADALL instruction. Where the illegal operation code is generated by an 80386 LOADALL instruction, the present invention will halt operation of the 80386 microprocessor. Where the illegal operation code generated is neither of the above cases, the present invention will return control of the system to the normal 80386 illegal operation code handler.

The present invention first retrieves the DS and ES selectors from the table of prestored values referred to as the 286 LOADALL buffer and replaces the selector flag value, if flag is equal to 1, with a special selector value (0FFF0h) which is unlikely to be used by other software applications. At this time the Access Privilege level is modified to DPL=3. This differs from the Intel suggested emulation as Intel sets the RPL=0, the highest privilege level. If the selector flag values are already set to 0FFF0h, the present invention does not alter the flag values or modify privilege levels. The present invention then creates entries for these values in the GDT and LDT of the LOADALL emulation buffer.

The present invention retrieves the DS and ES selector values from the 286 LOADALL buffer. The physical address of the DS and ES descriptive caches is then calculated and the GTD base for the DS and ES descriptor caches is determined. The base, limit and attribute information for the DS and ES descriptor caches is then loaded into the LDT entries of the LOADALL emulation buffer. At that time, the limit is set to the maximum real mode limit of 1 Mbyte (0FFFFFh), the access mode set to read only and the descriptor privilege level is set equal to 3.

Any task which uses the 286 LOADALL instruction must be operating in real mode. Accordingly, the 80386 processor is in real mode during the above operations. However, in order for the register values to be loaded with values in excess of the real mode limits 1 Mbyte or 0FFFFFh, the 80386 processor must be in protected mode. Operation of the microprocessor under OS/2 results in the ES and DS selectors and descriptor caches being set to access addresses in excess of this real mode limit. Therefore, the present invention switches the 80386 microprocessor to protected mode and loads the modified ES and DS selector and descriptor caches from the 286 LOADALL buffer which has been updated by the LOADALL emulation buffer. The present invention then switches back to real mode and the remainder of the registers are loaded from the 286 LOADALL buffer.

Following the loading of the registers and descriptor caches, control of the 80386 microprocessor is returned to the system. In accomplishing this emulation, the present invention has replaced any illegal or invalid selector values with a valid high selector value (0FFF0h). This value will not create any errors in subsequent processing by a task, whereas the known invalid flag value of 1 loaded by OS/2 and the Intel method may create subsequent errors in processing. Further, the present invention accomplishes the loading of all the necessary registers and descriptor caches while maintaining the descriptor privilege level at the lowest possible level and does not modify the requested privilege level as Intel does. Accordingly, it is unlikely that any processing errors will occur as a result of general privilege level violations.

FIG. 6 is a detailed flow chart of the operation of the present invention.

Figure 6A:
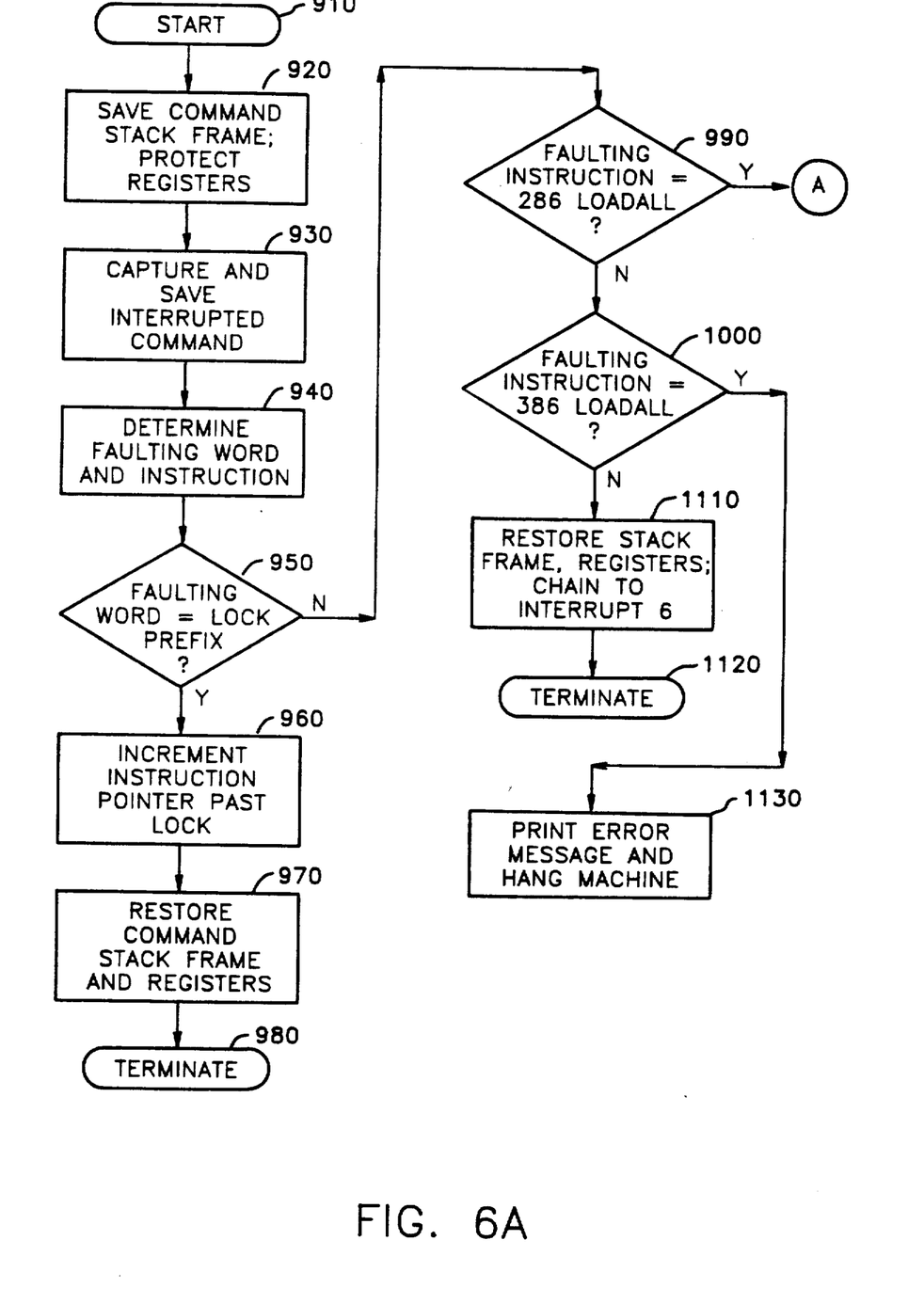
FIGS. 6A-6D are a flow chart of the operation of the present invention.

Referring now to FIG. 6A, which is a flow chart diagram of the operation of the present invention, an 80386 computer system is presumed to be operating in real mode when it receives an illegal operation code exception. Upon receiving the exception, the computer system begins the special interrupt emulation routine starting at Step 910. Control is transferred to Step 920, where the current command stack frame and registers are saved for later retrieval. Control is the transferred to Step 930 which captures and saves the interrupted command. Step 940 then determines the faulting instruction passes control to Step 950.

Step 950 determines whether the faulting instruction has a lock prefix. A lock prefix is designed to assert control over the bus for the duration of the instruction.

If the faulting instruction includes a lock prefix, control of the system is passed on to Step 960 which increments the instruction pointer past the lock prefix. Control is then transferred to Step 970 which restores the command stack frame and existing code segment register. Control is then transferred to Step 980 which terminates operation of the special interrupt handler and resumes operation of the normal 80386 interrupt handling routines.

If the faulting instruction does not include a lock prefix, control is transferred to Step 990 which determines if the faulting instruction was a 286 LOADALL instruction (050Fh).

If the faulting instruction was not a LOADALL instruction, control is then passed on to Step 1000 which determines whether the faulting instruction was a 386 LOADALL instruction (070Fh). If the faulting instruction was not a 386 LOADALL instruction, control is transferred to Step 1110 which restores the stack frame and registers. Control of the system is then passed on to Step 1120 which terminates the operation of the special interrupt handler and transfers control of system back to the normal 80386 illegal operation code handler.

If the faulting instruction was a 386 LOADALL instruction as determined by Step 1000, control is then passed on to Step 1130 which precedes to print an error message and hangs the machine awaiting resetting.

Figure 6B:
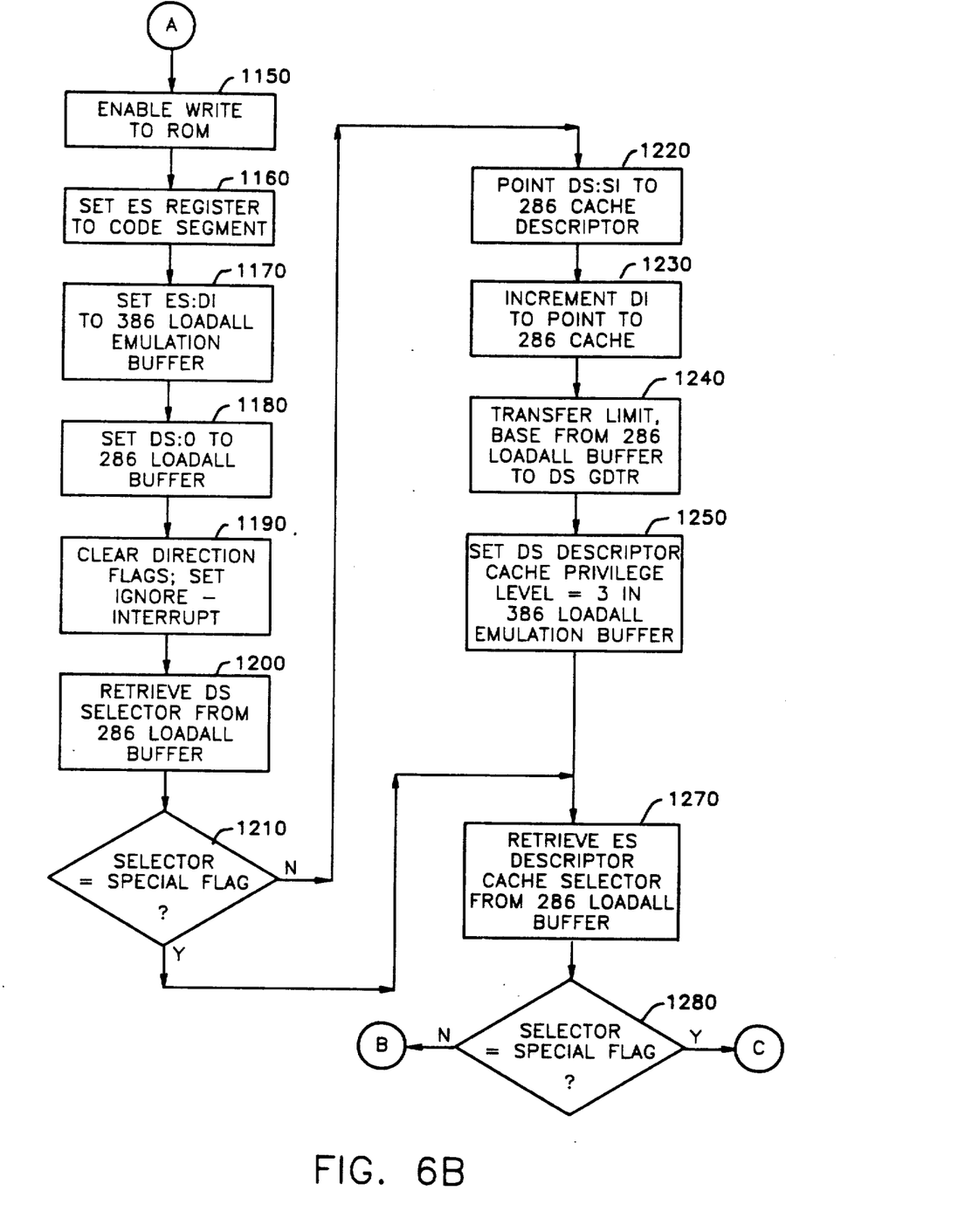

If Step 990 determines that the faulting instruction was the 286 LOADALL instruction, control is then passed on to Step 1150 appearing on FIG. 6B. Step 1150 enables the read only memory to a write mode for the purpose of this emulation. Control is then passed on to Step 1160 which sets the ES segment selector equal to the current code segment selector. Step 1170 sets the code segment now described by segment selector ES to the 386 LOADALL emulation buffer using the DI register. This is noted as ES:DI which indicates that the ES segment selector is pointing to a specific segment with the offset DI. Control of the system is then passed on to Step 1180 where the DS selector is set to the beginning of the 286 LOADALL buffer located at 800h in physical memory. Control of the system is then passed on to Step 1190 where all direction flags are cleared and the system is set to ignore any further interrupts.

In Step 1200 the system retrieves the preset DS segment selector from the 286 LOADALL buffer. This segment selector is then compared against a special flag value (0FFF0h) in Step 1210. This special value flag is designed to replace a possible illegal value of 1 which may have been entered as a result of OS/2 operations. The special flag value is valid and will not result in subsequent processing errors. When the segment selector value is not equal to the special flag value, control of the system is then passed on to Step 1220. If the DS selector stored in the 286 LOADALL buffer is equal to the special flag, control of the system is passed on to Step 1270. In Step 1220 the SI register is offset to the position of the DS descriptor cache entry in the segment described by segment selector DS. Accordingly, DS:SI now points to the 286 DS descriptor cache entry.

Control is then passed on to Step 1230 wherein the ES segment selector is incremented to the global descriptor table DS descriptor cache entry. Control is then transferred to Step 1240 where an entry in the global descriptor table is created for the DS selector and corresponding descriptor cache. The limit and base information relating to DS segment selector and descriptor cache is loaded from the 286 LOADALL buffer into the global descriptor table. Control is then passed on to Step 1250 where the DS descriptor cache privilege level is set to 3 in the 386 LOADALL emulation buffer. Steps 1200-1250 have the effect of creating DS entries in both the global descriptor table and the local descriptor table. The creation of an entry into the global descriptor table for DS selector and descriptor cache causes an index entry to be created for the DS selector and descriptor cache in this local descriptor table. At the same time these operations ensure that the DS descriptor cache and selector values include the special valid flag is part of the selector in cache.

Control is then passed on to Step 1270 which retrieves the ES descriptor cache selector from the 286 LOADALL buffer. In Step 1280 the ES selector is compared with the special flag value. If equal to the special flag value control of the system is passed on to Step 1320 located in FIG. 6C. If the ES descriptor selector is not equal to the special flag value, control is then passed on to Step 1290 appearing on FIG. 6C. In Step 1290 offset SI is incremented to the location of the ES descriptor cache in the 286 LOADALL buffer. Accordingly, DS:SI now points to the 286 ES descriptor cache and the ES:DI points to the GDT ES descriptor cache entry in the global descriptor table. In Step 1300 the global descriptor table ES descriptor cache is loaded from the 286 LOADALL buffer. Control of the system is then passed on to Step 1310 where the ES descriptor cache privilege level to is set to 3 in the global descriptor table. Steps 1270-1310 have the effect of transferring the pre-loaded values in the 286 LOADALL buffer into the global descriptor table and the local descriptor table.

Figure 6C:
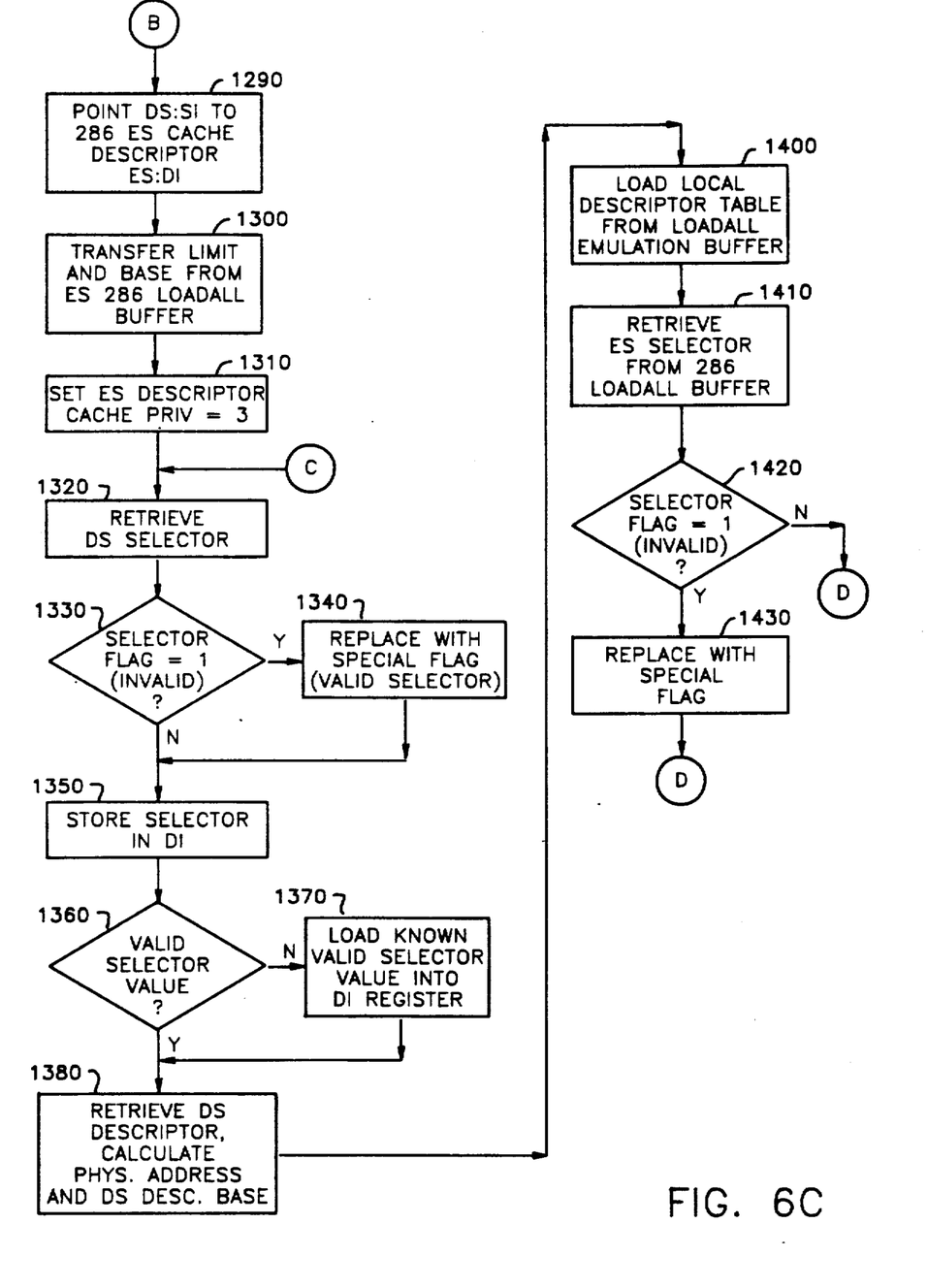

In Step 1320, the DS selector is retrieved from the 286 LOADALL buffer. Control is then passed on to Step 1330 where the DS selector flag is compared with the value of 1. A value 1 is invalid in value and will cause further errors to occur. Where equal to 1, control is passed on to Step 1340 where the selector flag value is replaced with the special flag which acts as a valid selector. Control is then passed on to Step 1350. If the DS selector flag is not equal to 1, control is passed from Step 1330 to Step 1350. In Step 1350, the selector value is stored in the DI offset register for later use in loading the descriptor cache. Control is then passed on to Step 1360 where it is determined whether the selector value is valid. If not valid, control of the system is passed on to Step 1370 where a known valid selector value is loaded into the DI register. Step 1370 then passes control of the system to Step 1380. If the selector value is valid in 1360, control of the system is then passed directly on to Step 1380.

In Step 1380 the DS selector value is retrieved from the 286 LOADALL emulation buffer. The physical address of the DS cache is calculated for DS cache address in the LOADALL emulation buffer. The base entry is then calculated by subtracting the DS selector value from the physical address to calculate the global descriptor table DS cache base. Control is then passed on to Step 1400 wherein the local descriptor table is loaded from the 386 emulation buffer. Control is then passed on to Step 1410 where the ES selector is retrieved from the 286 LOADALL buffer. In Step 1420 the ES selector flag is compared to 1, an invalid value. If not equal to 1, control of the system is then passed on to Step 1440 appearing on FIG. 6D. If the selector value is equal to 1 control of the system is then passed on to Step 1430 where the ES selector value is replaced with the special flag. Control of the system is then passed on to Step 1440 wherein the ES selector value is saved in the SI register for later use in loading the descriptor cache. Control is then passed on to Step 1450 where it is determined whether the ES selector value is a valid value. If not a valid value, control is passed on to Step 1460 which loads a known selector value into the SI offset and then returns control of the system to Step 1470. If the ES selector value in Step 1450 is a valid value, control is passed on to Step 1470. In Step 1470 the the ES selector value is retrieved from the 286 LOADALL emulation buffer. The physical address of the ES cache is calculated for the 386 ES cache address in the LOADALL emulation buffer. The base entry is then calculated by subtracting the ES selector value from the physical address. Control of the system is then passed on to Step 1490 where the local descriptor table ES cache value is loaded from ES 386 LOADALL emulation buffer. Steps 1410-1490 update the local descriptor table reference from the global descriptor table reference.

Figure 6D:
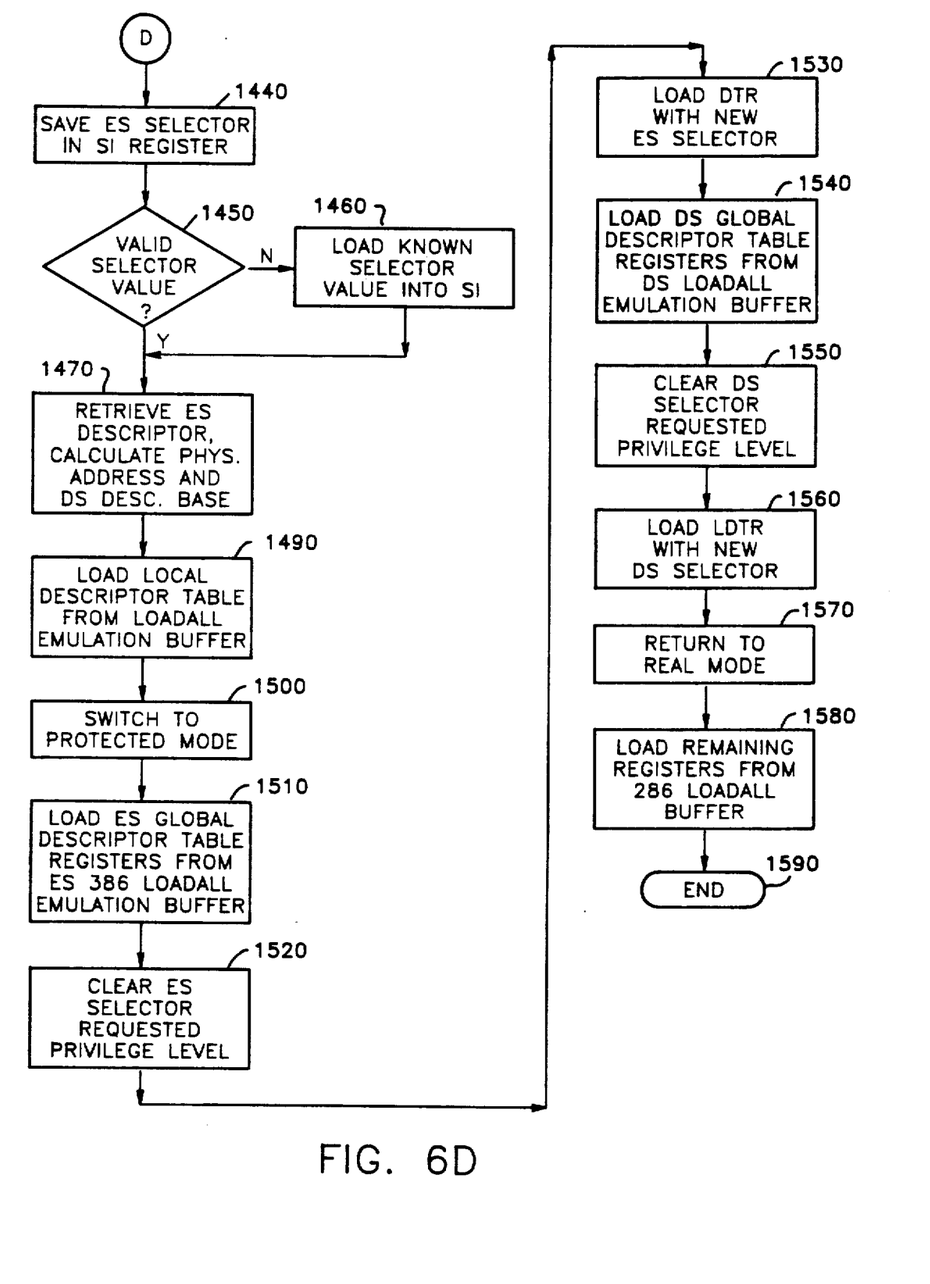

Control is then passed on to Step 1500 where the 80386 microprocessor is switched into protected mode. Control is then passed on to Step 1510 where the ES global descriptor table registers are loaded from the ES 386 LOADALL emulation buffer. Control is then passed on to Step 1520 where the ES selector requested privilege level is modified to a zero level. Control is then passed on to Step 1530 where the local descriptor table is also loaded with the new ES selector value. Control is then passed on to Step 1540 where the DS global descriptor table registers are loaded from the DS 386 LOADALL emulation buffer. Control is then passed on to Step 1550 where the DS selector requested privilege level is modified to a zero level. Control is then passed on to Step 1560 where the local descriptor table reference is loaded with the new DS selector. Control is then passed on to Step 1570 wherein the 80386 microprocessor returns to real mode. Control is then passed on to Step 1580 where in the remaining registers are loaded from the 286 LOADALL buffer. Control is then passed on to Step 1590 which concludes the special illegal operations code handler.

The foregoing disclosure and description of the invention are illustrative and explanatory thereof, and various changes in the order, coding, registers and memory locations or microprocessor utilized without departing from the spirit of the invention wherein said microprocessors adopt the memory addressing, management and protection techniques described above.

I claim:

1. A method for memory management in a computer system operating in a multi-task environment, the computer system conforming to an industry standard of memory management utilizing a segmented addressing technique to locate and describe information within said computer system memory, the addressing technique utilizing:

a plurality of registers;

a shared global segment descriptor table, the global descriptor table including a multiplicity of segment descriptor caches, the segment descriptor caches describing and locating wherein the computer system memory information shared by multiple tasks may be accessed and having a privilege level which sets access rights to the global segment descriptor cache; and at least one local segment descriptor table, the local descriptor table including a multiplicity of segment descriptor caches, the segment descriptor caches describing and locating wherein the computer system memory information unique to a particular task may be accessed and having a privilege level which sets access rights to the local segment descriptor cache, the computer system having first and second mutually incompatible operating modes for addressing memory, the first operating mode conforming to the above the industry standard addressing technique, the second mode addressing information by physical location in the computer system memory, the first operating mode capable of addressing more memory than the second operating mode, the computer system having an operating system capable of supporting either of the mutually incompatible operating and addressing modes, the operating system allocating at least two of the registers for addressing memory in excess of that capable by the second addressing mode, thereby requiring that the computer system be operating in the first mode to load the allocated registers, the computer system having in memory a table of prestored values corresponding to the registers and associated global and local segment descriptor cache, the method being directed to the loading of all registers and global and local segment descriptor caches from the table of prestored values while operating in the second operating mode, the method comprising:

(a) trapping an illegal operation code exception generated by the computer system in response to an instruction requesting the loading of all registers and descriptor caches while operating in the second mode;

(b) interrupting control of the computer system operating system;

(c) retrieving the allocated segment selector register values from the prestored table and determining if the register values are equal to a valid predetermined value;

(d) modifying the retrieved segment selector register values to the predetermined value and modifying the privilege level of the segment descriptor caches corresponding to the allocated segment selector registers to the lowest possible privilege level within the computer system when the retrieved allocated segment selector register and corresponding segment descriptor values are not equal to the predetermined value;

(e) creating entries in the global and local descriptor tables for the modified segment selector register and corresponding descriptor caches;

(f) comparing the allocated segment selector registers values in the prestored table with said modified allocated selector register values and replacing the table values with said modified values when not equal to said modified allocated segment register values;

(g) determining the address location information for the allocated segment selector values and corresponding segment descriptor caches and loading same into corresponding segment selector and segment descriptor entries in the prestored table;

(h) switching the computer system from the second operating mode to the first operating mode;

(i) loading as current values for the computer system allocated segment selector registers and corresponding segment descriptor caches selector values from the prestored table;

(j) switching the computer system from the first operating mode to the second operating mode;

(k) loading as current values for the computer system segment selector registers and corresponding segment descriptor and control caches the remaining values from the prestored table; and (l) returning control of the computer to the operating system.

2. The method of claim 1, wherein said prestored table of segment selector values and segment descriptor caches are located in said computer physical memory at 800h.

3. The method of claim 1 wherein said predetermined valid value is equal to 0FFF0h.

* * * * *